(12) United States Patent
Su et al.

(10) Patent No.: US 11,514,608 B2
(45) Date of Patent: Nov. 29, 2022

(54) FISHEYE CAMERA CALIBRATION SYSTEM, METHOD AND ELECTRONIC DEVICE

(71) Applicant: SICHUAN VISENSING TECHNOLOGY CO., LTD., Chengdu (CN)

(72) Inventors: Xianyu Su, Chengdu (CN); Jia Ai, Chengdu (CN); Shuangyun Shao, Chengdu (CN)

(73) Assignee: SICHUAN VISENSING TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/469,840

(22) Filed: Sep. 8, 2021

(65) Prior Publication Data

US 2021/0407132 A1 Dec. 30, 2021

Related U.S. Application Data

(63) Continuation-in-part of application No. PCT/CN2019/113440, filed on Oct. 25, 2019.

(30) Foreign Application Priority Data

May 8, 2019 (CN) .......................... 201910381050.1
May 8, 2019 (CN) .......................... 201920664110.6

(51) Int. Cl.
*G06T 7/80* (2017.01)
*G06T 5/00* (2006.01)
*G06T 3/00* (2006.01)

(52) U.S. Cl.
CPC .............. *G06T 7/80* (2017.01); *G06T 3/0018* (2013.01); *G06T 5/006* (2013.01); *G06T 2207/10004* (2013.01); *G06T 2207/30208* (2013.01)

(58) Field of Classification Search
CPC ......... G06T 7/80; G06T 3/0018; G06T 5/006; G06T 2207/10004; G06T 2207/30208; G01B 11/00; G01M 11/00; H04N 5/232
(Continued)

(56) References Cited

U.S. PATENT DOCUMENTS 5,638,208 A * 6/1997 Walker .................... G03B 21/56
359/451
7,042,508 B2 5/2006 Jan et al.
(Continued)

FOREIGN PATENT DOCUMENTS

CN 101577002 A 11/2009
CN 102096923 A 6/2011
(Continued)

OTHER PUBLICATIONS

Kannala, Juho, and Sami S. Brandt. "A generic camera model and calibration method for conventional, wide-angle, and fish-eye lenses." IEEE transactions on pattern analysis and machine intelligence 28.8 (2006): 1335-1340. (Year: 2006).*

(Continued)

*Primary Examiner* — Geoffrey E Summers

(57) ABSTRACT

Provided are a fisheye camera calibration system, method and an electronic device. The system includes a hemispherical target, a fisheye camera and an electronic device. The hemispherical target includes a hemispherical inner surface and multiple markers provided on the hemispherical inner surface. The fisheye camera is used for photographing the hemispherical target and acquiring a target image, where the hemispherical target and the multiple markers provided on the hemispherical inner surface are captured in the target image. The electronic device is used for acquiring initial values of $k_1$, $k_2$, $k_3$, $k_4$, $k_5$, $u_0$, $v_0$, $m_u$ and $m_v$, and using a Levenberg-Marquardt algorithm to optimize the initial val- (Continued)

ues of $k_1$, $k_2$, $k_3$, $k_4$, $k_5$, $u_0$, $v_0$, $m_u$ and $m_v$, so as to determine imaging model parameters of the fisheye camera.

17 Claims, 6 Drawing Sheets

(58) Field of Classification Search
USPC .......................................................... 382/275
See application file for complete search history.

(56) References Cited

U.S. PATENT DOCUMENTS

| | | | |
|---|---|---|---|
| 8,350,913 B2* | 1/2013 | Ban | G06T 7/80 |
| | | | 348/189 |
| 8,363,089 B2 | 1/2013 | Inagaki | |
| 9,589,348 B1* | 3/2017 | Linde | H04N 17/002 |
| 2005/0280709 A1* | 12/2005 | Katayama | G01C 11/02 |
| | | | 348/E13.016 |
| 2013/0265571 A1* | 10/2013 | Bassi | G01M 11/0264 |
| | | | 356/127 |
| 2015/0271453 A1* | 9/2015 | Chuang | H04N 5/23238 |
| | | | 348/39 |
| 2016/0182903 A1* | 6/2016 | Grundhöfer | H04N 17/002 |
| | | | 348/187 |
| 2016/0210750 A1* | 7/2016 | Singh | G06T 7/80 |
| 2018/0020206 A1* | 1/2018 | Sheridan | H04N 13/327 |
| 2018/0035047 A1 | 2/2018 | Hua et al. | |
| 2020/0257356 A1* | 8/2020 | Rosell | G06F 3/013 |

FOREIGN PATENT DOCUMENTS

| | | | |
|---|---|---|---|
| CN | 103426168 | A | 12/2013 |
| CN | 203849004 | U | 9/2014 |
| CN | 106548477 | A | 3/2017 |
| CN | 106651859 | A | 5/2017 |
| CN | 107123149 | A * | 9/2017 |
| CN | 107123149 | A | 9/2017 |
| CN | 206460515 | U | 9/2017 |
| CN | 107610185 | A | 1/2018 |
| CN | 207115502 | U | 3/2018 |

OTHER PUBLICATIONS

SIPO, First Office Action for CN Application No. 201910381050.1, dated Nov. 5, 2019.
SIPO, Second Office Action for CN Application No. 201910381050.1, dated Feb. 27, 2020.
SIPO, Third Office Action issued for CN Application No. 201910381050.1, dated Apr. 17, 2020.
WIPO, Written opinion of the International Search Authority for PCT Application No. PCT/CN2019/113440, dated Jan. 31, 2020.
WIPO, International Search Report for PCT Application No. PCT/CN2019/113440, dated Jan. 31, 2020.

* cited by examiner

FISHEYE CAMERA CALIBRATION SYSTEM, METHOD AND ELECTRONIC DEVICE

CROSS-REFERENCE TO RELATED APPLICATION

This application is a continuation-in-part of PCT Application PCT/CN2019/113440, filed on Oct. 25, 2019. The PCT Application claims priority to Chinese patent applications No. 201920664110.6 and No. 201910381050.1 which are filed on May 8, 2019. The contents of the aforementioned applications are incorporated herein by reference.

TECHNICAL FIELD

This disclosure relates to the technical field of camera calibration, and particularly to a fisheye camera calibration system, a fisheye camera calibration method, and an electronic device.

BACKGROUND

Camera calibration is one of the key technologies in machine vision, photogrammetry, 3D imaging, image geometric correction and the like. Camera calibration mainly aims to estimate internal and external parameters of cameras. The accuracy of the calibration result and the stability of the calibration algorithm directly affect the accuracy of subsequent work. In the general calibration methods, multiple images need to be captured, and thus it is necessary to manually move the calibration board or camera. In actual applications, this is not only laborious and time consuming, but also increases the cost of production.

SUMMARY

Embodiments of this disclosure propose a fisheye camera calibration system, a fisheye camera calibration method, a fisheye camera calibration device, an electronic device, and a storage medium, by which the above problems at least can be alleviated.

In a first aspect, the embodiments of the present disclosure provide a fisheye camera calibration system. The system includes a hemispherical target, a fisheye camera and an electronic device. The hemispherical target includes a hemispherical inner surface and a plurality of markers disposed on the hemispherical inner surface. The fisheye camera is configured to photograph the hemispherical target to capture a target image, where the hemispherical target and the plurality of markers disposed on the hemispherical inner surface of the hemispherical target are captured in the target image. The electronic device is configured to fit, according to the target image, a selected radial distortion model with a selected equidistant projection model, to obtain initial values of distortion parameters $k_1$, $k_2$, $k_3$, $k_4$ and $k_5$. The electronic device is further configured to calculate a radius $r_{max}$ according to the initial values of the distortion parameters $k_1$, $k_2$, $k_3$, $k_4$ and $k_5$ and an equation $r_{max}=k_1\theta_{max}+k_2\theta_{max}^3+k_3\theta_{max}^5+k_4\theta_{max}^7+k_5\theta_{max}^9$, where $\theta_{max}$ represents a maximum field of view. The electronic device is further configured to acquire initial values of $u_0$, $v_0$, $m_u$ and $m_v$, where ($u_0$, $v_0$) represents a principal point of the fisheye camera, $m_u$ represents the number of pixels per unit distance in a horizontal direction of coordinates of the target image, and $m_v$ represents the number of pixels per unit distance in a vertical direction of coordinates of the target image. The electronic device is further configured to optimize the initial values of $k_1$, $k_2$, $k_3$, $k_4$, $k_5$, $u_0$, $v_0$, $m_u$ and $m_v$ by using a Levenberg-Marquardt algorithm, to determine imaging model parameters of the fisheye camera.

In a second aspect, the embodiments of the present disclosure provide a fisheye camera calibration method. The method includes: acquiring a target image, where a hemispherical target and a plurality of markers disposed on a hemispherical inner surface of the hemispherical target are captured in the target image; fitting, according to the target image, a selected radial distortion model with a selected equidistant projection model, to obtain initial values of distortion parameters $k_1$, $k_2$, $k_3$, $k_4$ and $k_5$; calculating a radius $r_{max}$ according to the initial values of the distortion parameters $k_1$, $k_2$, $k_3$, $k_4$ and $k_5$ and an equation $r_{max}=k_1\theta_{max}+k_2\theta_{max}^3+k_3\theta_{max}^5+k_4\theta_{max}^7+k_5\theta_{max}^9$, where $\theta_{max}$ represents a maximum field of view; acquiring initial values of $u_0$, $v_0$, $m_u$ and $m_v$, where ($u_0$, $v_0$) represents a principal point of the fisheye camera, $m_u$ represents the number of pixels per unit distance in a horizontal direction of coordinates of the target image, and $m_v$ represents the number of pixels per unit distance in a vertical direction of coordinates of the target image; and optimizing the initial values of $k_1$, $k_2$, $k_3$, $k_4$, $k_5$, $u_0$, $v_0$, $m_u$ and $m_v$ by using a Levenberg-Marquardt algorithm, to determine imaging model parameters of the fisheye camera.

In a third aspect, the embodiments of the present disclosure provide a fisheye camera calibration device. The device includes an image acquisition module, a camera calibration module and a numerical optimization module. The image acquisition module is configured to acquire a target image, where a hemispherical target and a plurality of markers disposed on a hemispherical inner surface of the hemispherical target are captured in the target image. The camera calibration module is configured to fit, according to the target image, a selected radial distortion model with a selected equidistant projection model, to obtain initial values of distortion parameters $k_1$, $k_2$, $k_3$, $k_4$ and $k_5$. The camera calibration module is further configured to calculate a radius $r_{max}$ according to the initial values of the distortion parameters $k_1$, $k_2$, $k_3$, $k_4$ and $k_5$ and an equation $r_{max}=k_1\theta_{max}+k_2\theta_{max}^3+k_3\theta_{max}^5+k_4\theta_{max}^7+k_5\theta_{max}^9$, where $\theta_{max}$ represents a maximum field of view. The camera calibration module is further configured to acquire initial values of $u_0$, $v_0$, ma and $m_v$, where ($u_0$, $v_0$) represents a principal point of the fisheye camera, $m_u$ represents the number of pixels per unit distance in a horizontal direction of coordinates of the target image, and $m_v$ represents the number of pixels per unit distance in a vertical direction of coordinates of the target image. The numerical optimization module is configured to optimize the initial values of $k_1$, $k_2$, $k_3$, $k_4$, $k_5$, $u_0$, $v_0$, $m_u$ and $m_v$ by using a Levenberg-Marquardt algorithm, to determine imaging model parameters of the fisheye camera.

In a fourth aspect, the embodiments of the present disclosure provide an electronic device. The electronic device includes: one or more processors; a memory; and one or more programs. The one or more programs are stored in the memory and configured to be executed by the one or more processors, and the one or more programs are configured to execute the above-mentioned method.

In a fifth aspect, the embodiments of the present disclosure provide a computer-readable storage medium storing program codes thereon, and the program codes can be invoked by a processor to execute the above-mentioned method.

These and other aspects of the disclosure will be more comprehensive and understandable in the description of the following embodiments.

BRIEF DESCRIPTION OF THE DRAWINGS

In order to explain the technical solutions in the embodiments of the present disclosure more clearly, the drawings needed in the description of the embodiments will be briefly introduced in the following. Obviously, the drawings in the following illustrate only some embodiments of the present disclosure. For those skilled in the art, other drawings can also be obtained based on these drawings without any creative work.

DETAILED DESCRIPTION OF PREFERRED EMBODIMENTS

Figure 1:
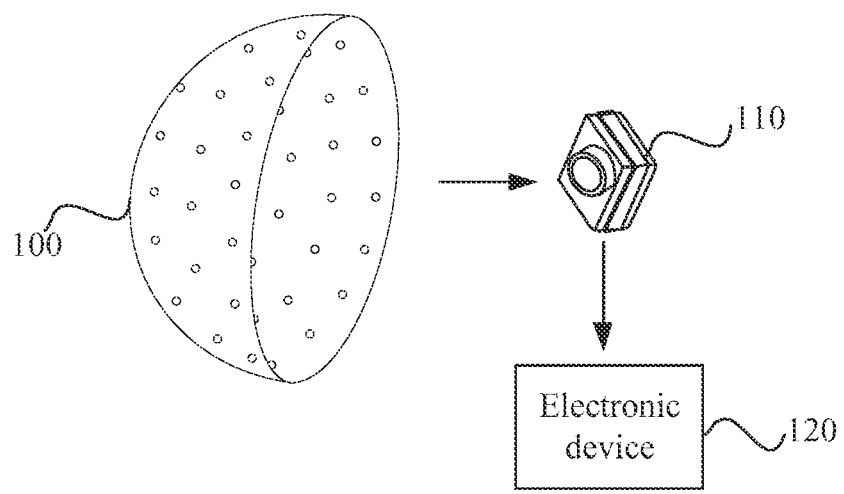
FIG. 1 is a schematic diagram illustrating a fisheye camera calibration system provided by the embodiments of the present disclosure.

In order to enable those skilled in the art to better understand the solutions of the present disclosure, the technical solutions in the embodiments of the present disclosure will be described clearly and completely in conjunction with the drawings hereafter.

Camera calibration is one of the key technologies in machine vision, photogrammetry, 3D imaging, image geometric correction and the like. Camera calibration mainly aims to estimate internal and external parameters of cameras. The accuracy of the calibration result and the stability of the calibration algorithm directly affect the accuracy of subsequent work. The camera having a general field of view can be represented by a pinhole camera model, and can be calibrated by using perspective projection and affine transformation. In recent years, fisheye cameras are widely used in fields such as panoramic vision, video surveillance, vehicle navigation and virtual reality, due to their large field of view. However, the large field of view also brings serious image distortion, which affects the intuitive visual perception of the human eye and the utilization of image information. In order to correct the image distortion, the fisheye cameras need to be calibrated.

At present, the mature calibration methods adopt a planar target, and there are tool software based on the planar target, such as Matlab toolbox and Opencv tool software. In these methods, a planar calibration board is placed at different positions in front of the fisheye camera to capture multiple target images, so as to obtain a wide range of raw data for calibration. In such methods, the calibration board requires to be moved many times so as to be located at different positions for capturing respective target images, or the fisheye camera requires to be rotated many times so as to be located at different angles for capturing respective target images. These methods are not suitable for some situations that require quick installation and calibration of fisheye cameras, such as mass production or assembly lines for fisheye cameras.

In view of this, the inventor proposes the fisheye camera calibration system, method and device, an electronic device, and a storage medium described in the embodiments of the present disclosure. In the embodiments, a target image of a hemispherical target is captured, where the hemispherical target and multiple markers disposed on a hemispherical inner surface of the hemispherical target are captured in the target image. Based on the target image, a selected radial distortion model is fitted with a selected equidistant projection model, to obtain initial values of distortion parameters $k_1$, $k_2$, $k_3$, $k_4$ and $k_5$. According to the initial values of the distortion parameters $k_1$, $k_2$, $k_3$, $k_4$ and $k_5$ and an equation $r_{max} = k_1 \theta_{max} + k_2 \theta_{max}^3 + k_3 \theta_{max}^5 + k_4 \theta_{max}^7 + k_5 \theta_{max}^9$, a radius $r_{max}$ is calculated, where $\theta_{max}$ represents a maximum field of view. Initial values of $u_0$, $v_0$, $m_u$ and $m_v$ are acquired, and a Levenberg-Marquardt algorithm is used to optimize the initial values of $k_1$, $k_2$, $k_3$, $k_4$, $k_5$, $u_0$, $v_0$, $m_u$ and $m_v$, to determine imaging model parameters of the fisheye camera. By using the hemispherical target, there is no need to move the target or the camera to capture multiple target images, and only one target image is sufficient to realize fast and high-precision calibration of the fisheye camera.

Referring to FIG. 1, a fisheye camera calibration system provided by the embodiments of the present disclosure is shown. The system may include a hemispherical target 100, a fisheye camera 110 and an electronic device 120. The hemispherical target 100 includes a hemispherical inner surface and multiple markers disposed on the hemispherical inner surface. The number of the markers is not less than 23, and one of the markers is disposed at the center of the hemispherical inner surface. The fisheye camera 110 is placed at the center of sphere of the hemispherical target 100, and photographs the hemispherical target 100 to capture a target image.

The hemispherical target and the multiple markers disposed on the hemispherical inner surface of the hemispherical target are all captured in the target image.

The fisheye camera 110 may send the captured target image to the electronic device 120. The fisheye camera 110 and the electronic device 120 may be one device, or may be two devices. The electronic device 120 fits, based on the target image, a selected radial distortion model with a selected equidistant projection model, to obtain initial values of distortion parameters $k_1$, $k_2$, $k_3$, $k_4$ and $k_5$. According to the initial values of the distortion parameters $k_1$, $k_2$, $k_3$, $k_4$ and $k_5$ and an equation $r_{max} = k_1 \theta_{max} + k_2 \theta_{max}^3 + k_3 \theta_{max}^5 + k_4 \theta_{max}^7 + k_5 \theta_{max}^9$, the electronic device calculates a radius $r_{max}$ where $\theta_{max}$ represents a maximum field of view. The electronic device acquires initial values of $u_0$, $v_0$, $m_u$ and $m_v$, where $(u_0, v_0)$ represents a principal point of the fisheye camera, $m_u$ represents the number of pixels per unit distance in a horizontal direction of coordinates of the image, and $m_v$ represents the number of pixels per unit distance in a vertical direction of coordinates of the image. The electronic device uses a Levenberg-Marquardt algorithm to optimize the initial values of $k_1$, $k_2$, $k_3$, $k_4$, $k_5$, $u_0$, $v_0$, $m_u$ and $m_v$ to determine imaging model parameters of the fisheye camera, thereby calibrating the fisheye camera 110.

Figure 2:
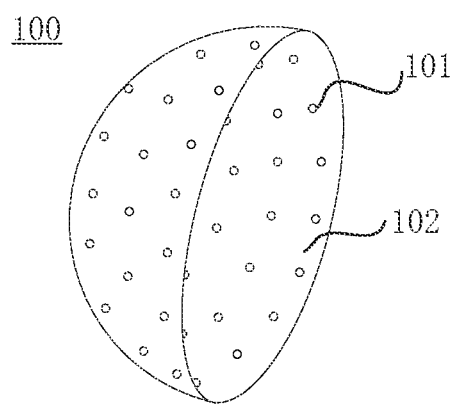
FIG. 2 is a schematic diagram illustrating a hemispherical target provided by the embodiments of the present disclosure.

The hemispherical target 100 includes a hemispherical inner surface and multiple markers disposed on the hemispherical inner surface. Referring to FIG. 2, a schematic diagram of the hemispherical target is illustrated. The hemispherical target includes markers 101 and the hemispherical inner surface 102. The markers 101 are evenly distributed on the hemispherical inner surface 102.

Figure 3:
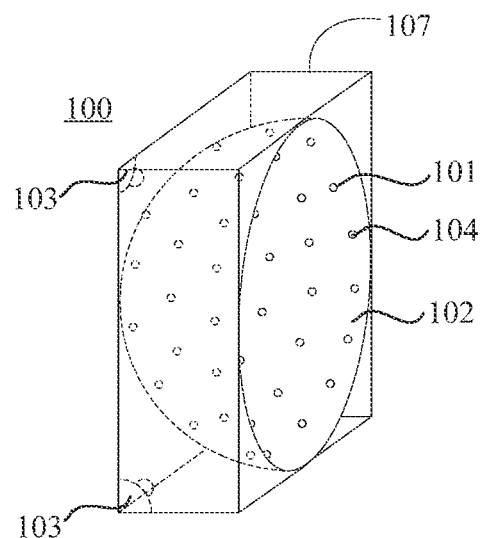
FIG. 3 is a schematic diagram illustrating a hemispherical target provided by the embodiments of the present disclosure, which is provided with holes for forming markers.

The markers 101 may include markers on the hemispherical inner surface which are formed when light emitted from a light source passes through multiple holes provided in the hemispherical inner surface. The multiple holes provided in the hemispherical inner surface have a same size, and accordingly, the corresponding markers 101 provided by the light passing through the holes have the same size. One of the multiple holes is disposed at the center of the hemispherical inner surface, and other holes can be evenly distributed on the hemispherical inner surface according to actual requirements. As shown in FIG. 3, a schematic diagram of the hemispherical target, which is provided with holes for forming markers, is illustrated. The hemispherical target may further include a housing 107 and at least one light source 103. The at least one light source 103 is disposed inside the housing of the hemispherical target. The housing may be rectangular, as shown in FIG. 3, or it may be hemispherical. The shape of the housing may be set as required, which is not limited here. The hemispherical inner surface is defined inside the housing, and it is concave in the housing, that is, it is recessed into the housing. The at least one light source 103 is disposed inside the housing at an opposite side from the hemispherical inner surface, for example, the at least one light source 103 may be disposed at one or more corners of the rectangular housing. When the light emitted from the at least one light source 103 passes through the holes, the markers 101 are formed, i.e., the markers are formed by the light emitted from the at least one light source and passing through the holes, in which other parts of the housing may be shaded so that the light emitted from the at least one light source can only pass through the holes. A light-transmitting diffuse reflection film 104 may also be provided, for example pasted, on the holes and cover the holes. In this way, the light passing through the holes is enabled to be more uniform and sharper, and the markers captured in the target image are clear, which is beneficial to improve the accuracy of the calibration.

Figure 4:
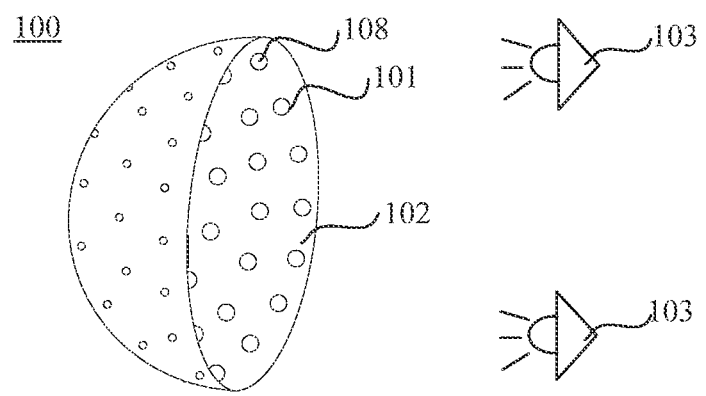
FIG. 4 is a schematic diagram illustrating a hemispherical target mounted with spherical markers provided by the embodiments of the present disclosure.

The markers 101 may also be provided by spherical markers 108 installed in the holes that are formed in the hemispherical inner surface. The multiple installed spherical markers have a same diameter, and the center of sphere of each spherical marker is located on a line connecting the center of the respective hole and the center of sphere of the hemispherical inner surface. Specifically, the spherical markers may be embedded in the hemispherical inner surface 102, that is, a part of each spherical marker 101 protrudes from the hemispherical inner surface 102, or the whole of each spherical marker protrudes from the hemispherical inner surface 102. As shown in FIG. 4, a schematic diagram of a hemispherical target mounted with spherical markers is illustrated. The diameter of the spherical marker is greater than the diameter of the respective hole, and the whole of the spherical marker protrudes from the hemispherical inner surface. It is understandable that the diameter of the spherical marker may be equal to the diameter of the respective hole, which is not limited here.

The spherical markers each have a diffuse reflection surface. The hemispherical target may further include at least one light source 103 disposed on the same side as the hemispherical inner surface. The light emitted by the at least one light source 103 can radiate the multiple spherical markers, then the markers 101 are formed on the hemispherical inner surface, i.e., the markers are formed by the multiple spherical markers being irradiated by the at least one light source. The spherical markers may also be self-luminous spherical markers, in this case, the markers 101 on the hemispherical inner surface are formed when the spherical markers radiate by themselves. Similarly, one of the spherical markers is disposed at the center of the hemispherical inner surface, and other spherical markers can be evenly distributed on the hemispherical inner surface according to actual requirements.

Figure 5:
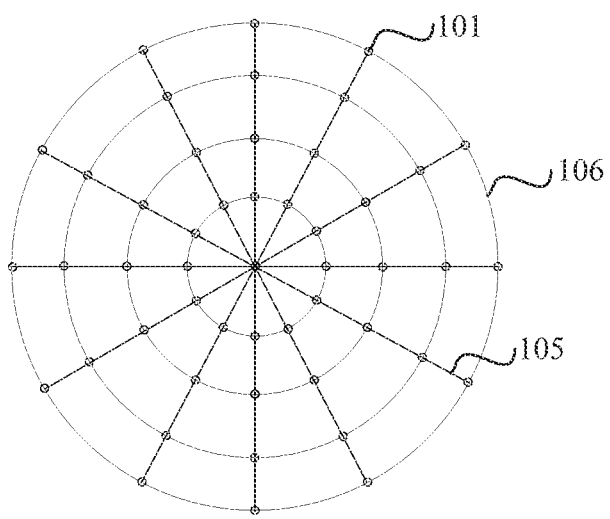
FIG. 5 is a plan view illustrating the distribution of markers of a hemispherical target provided by the embodiments of the present disclosure.

The markers 101 are disposed at different longitudes and latitudes in a spherical coordinate system established basing on the hemispherical target. Specifically, the values of latitude and longitude can be set as required. In the embodiments of this disclosure, the longitudes may be 0, 30, 60, 90, 120, 150, 180, 210, 240, 270, 300, and 330 degrees, which are 12 in total; and the latitudes may be 0, 20, 40, 60, and 80 degrees, which are 5 in total. The number of the markers 101 is not less than 23, which enables the accuracy of calibrating the fisheye camera with the hemispherical target to be high. In the embodiments of the present disclosure, the number of the markers 101 is 49. Referring to FIG. 5, a plan view illustrating the distribution of the markers in the hemispherical target is shown. In this view, the latitude lines 106 are represented by circles in the figure, and the longitude lines 105 are represented by 12 straight lines passing through the centers of the circles. The markers 101 are distributed at the intersections of the latitude lines and the longitude lines.

Figure 6:
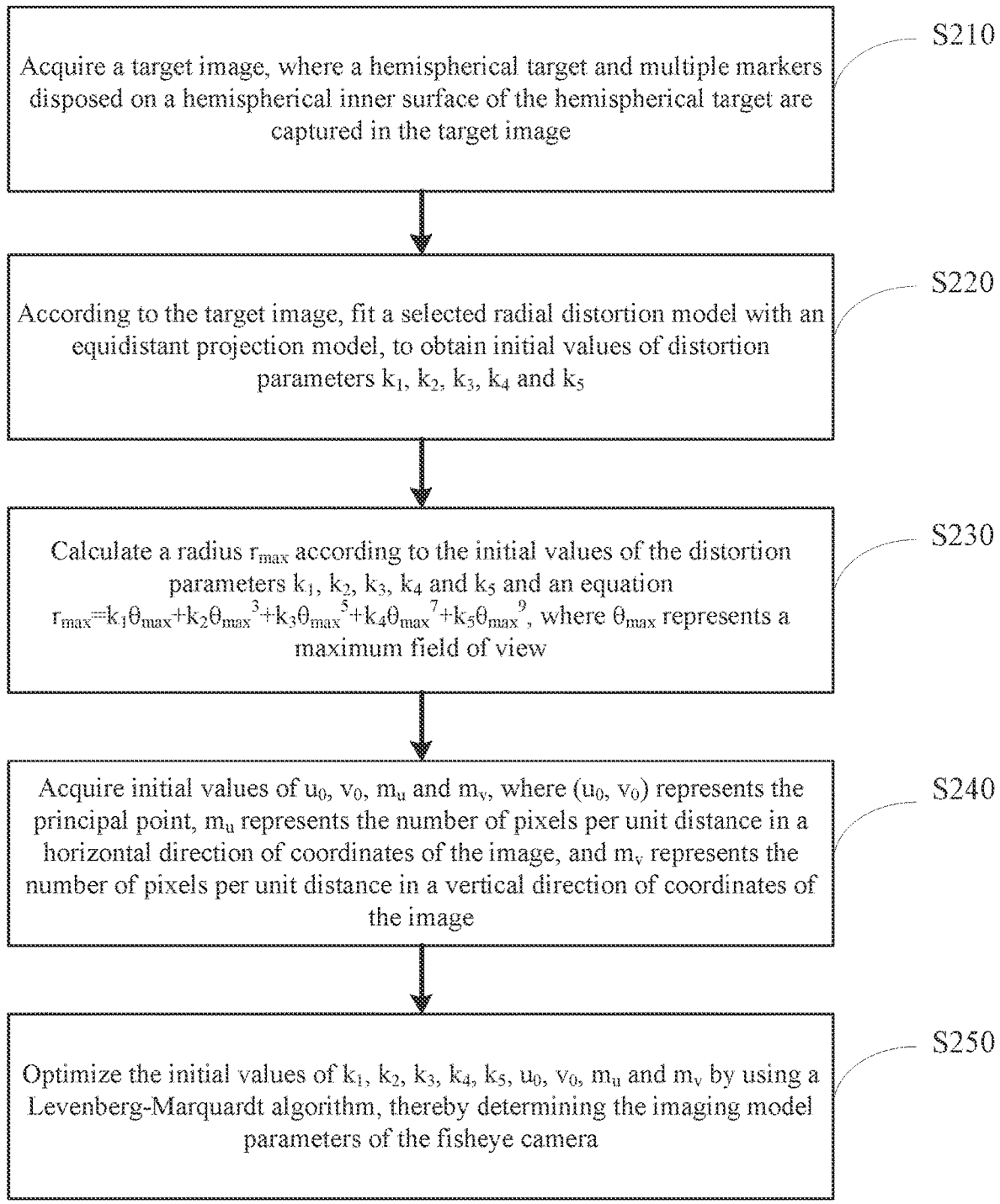
FIG. 6 is a flowchart illustrating a fisheye camera calibration method provided by the embodiments of the present disclosure.

Referring to FIG. 6, a fisheye camera calibration method provided by the embodiments of the present disclosure is illustrated, which include operations as follows.

At block S210, a target image is acquired, where a hemispherical target and multiple markers disposed on a hemispherical inner surface of the hemispherical target are captured in the target image.

An electronic device can obtain the target image captured by a fisheye camera, which fisheye camera is a camera with a fisheye lens. In the target image, the hemispherical target and the multiple markers disposed on the hemispherical inner surface of the hemispherical target are captured. Specifically, the target used in the embodiments of the disclosure is a hemispherical target, and multiple markers are provided on the hemispherical inner surface of the shell of the hemispherical target. These markers are disposed at different latitudes and longitudes determined in a spherical coordinate system established basing on the hemispherical target. The number of the markers is not less than 23, one of the markers is disposed at the center of the hemispherical inner surface, and other markers are evenly distributed on the hemispherical inner surface, the detail of which may be referred to FIG. 2 which illustrates a schematic diagram of the hemispherical target.

At block S220, according to the target image, a selected radial distortion model is fitted with a selected equidistant projection model, to obtain initial values of distortion parameters $k_1$, $k_2$, $k_3$, $k_4$ and $k_5$.

The imaging of common cameras follows the pinhole camera model, in which straight lines in the actual scene are still projected as straight lines on the image plane in the imaging process.

However, if the imaging of the fisheye camera follows the pinhole camera model, the projected image becomes very large, and when the camera's field of view reaches 180 degrees, the image becomes enormously large. Therefore, due to the ultra-wide field of view characteristics of the fisheye camera, a field of view of hemisphere cannot be projected onto a limited image plane through projection transformation, and other models have to be adopted.

In the embodiments of this disclosure, an equidistant projection model is selected as the fisheye camera model. The way of equidistant projection may be represented by $r=f\theta$, where $r$ represents the distance from any point in the target image to the distortion center, $f$ represents the focal length of the fisheye camera, and $\theta$ represents an angle between the incident light and the optical axis of the fisheye camera.

Since the projection model of the fisheye camera enables the largest possible scene to be projected into a limited image plane, this results in camera distortions, and particularly, the radial distortion of the fisheye camera is serious. Accordingly, the radial distortion of the fisheye camera is mainly considered. When only the radial distortion of the fisheye camera is considered, based on the equidistant projection model that is selected as the fisheye camera model, the radial distortion model of the fisheye camera can be represented by:

$$r(\theta)=k_1\theta+k_2\theta^3+k_3\theta^5+k_4\theta^7+k_5\theta^9+\ldots$$

where $r$ is a distance between a pixel on the target image and the principal point of the camera system, $\theta$ is the angle between the incident light and the optical axis of the camera system, $k_1$, $k_2$, $k_3$, $k_4$ and $k_5$ are 5 distortion parameters in the radial distortion model of the fisheye camera, which constitute the internal parameters of the fisheye camera together with other 4 parameters $u_0$, $v_0$, $m_u$ and $m_v$. In this model, the distortion parameters are not limited to $k_1$, $k_2$, $k_3$, $k_4$ and $k_5$, and $k_6$, $k_7$, $\ldots$ $k_n$ may also be included. In the embodiments of this disclosure, it is illustrated by taking a case where only $k_1$, $k_2$, $k_3$, $k_4$ and $k_5$ are used and accordingly, 9 internal parameters, including $k_1$, $k_2$, $k_3$, $k_4$, $k_5$, $u_0$, $v_0$, $m_u$ and $m_v$, are adopted to express the imaging characteristics of the fisheye camera, as an example.

The selected radial distortion model, i.e., $r(\theta)=k_1\theta+k_2\theta^3+k_3\theta^5+k_4\theta^7+k_5\theta^9+\ldots$ is fitted with the equidistant projection model $r=f\theta$. Among the distortion parameters, the influence of high-order distortion parameters is relatively small. Thus, in calculating the initial values, the initial values of the high-order distortion parameters may be set as 0. That is, $k_3=0$, $k_4=0$, and $k_5=0$. Accordingly, in the embodiments of this disclosure, the radial distortion model can be represented as $r=k_1\theta+k_2\theta^3$. This radial distortion model is fitted with the required projection model $r=f\theta$, and by using the focal length $f$ and maximum field of view which are parameters provided by the manufacturer (for example, the focal length of a fisheye camera is 8 mm, and the maximum field of view of the fisheye camera $\theta_{max}$ is 180 degrees), $k_1=f$ and $k_2=0$ can be obtained.

At block S230, a radius $r_{max}$ is calculated according to the initial values of the distortion parameters $k_1$, $k_2$, $k_3$, $k_4$ and $k_5$ and an equation $r_{max}=k_1\theta_{max}+k_2\theta_{max}^3+k_3\theta_{max}^5+k_4\theta_{max}^7+k_5\theta_{max}^9$, where $\theta_{max}$ represents a maximum field of view.

Since $k_1=f$, $k_2=0$, and $k_3$, $k_4$, and $k_5$ are all initially set as 0, and the radius is represented by an equation $r=k_1\theta_{max}+k_2\theta_{max}^3+k_3\theta_{max}^5+k_4\theta_{max}^5+k_5\theta_{max}^9$, the radius can be calculated as $r_{max}=f\theta_{max}$. Taking the aforementioned fisheye camera with a focal length $f$ of 8 mm and a maximum field of view $\theta_{max}$ of 180 degrees as an example, the obtained values of the distortion parameters and the maximum field of view of the fisheye camera of 180 degrees, i.e., $\theta_{max}=\pi/2$, are substituted into the equation $r_{max}=k_1\theta_{max}+k_2\theta_{max}^3+k_3\theta_{max}^5+k_4\theta_{max}^7+k_5\theta_{max}^9$, thereby obtaining $r_{max}=f*\pi/2$.

At block S240, initial values of $u_0$, $v_0$, $m_u$ and $m_v$ are acquired, where $(u_0, v_0)$ represents the principal point, $m_u$ represents the number of pixels per unit distance in a horizontal direction of coordinates of the image, and $m_v$ represents the number of pixels per unit distance in a vertical direction of coordinates of the image.

That is, $m_u$ and $m_v$ are the number of pixels per unit distance in the horizontal direction and the number of pixels per unit distance in the vertical direction of coordinates of the image, respectively.

In some embodiments, ellipse fitting may be performed on the hemispherical target in the image, to obtain values of a, b, $u_0$ and $v_0$, where a is the length of the major axis of an ellipse, b is the length of the minor axis of the ellipse, and $(u_0, v_0)$ represents the principal point.

In specific, $m_u$ and $m_v$ are calculated from the actually acquired image of a circle, where $m_u$ represents the number of pixels per unit distance in a horizontal direction of coordinates of the image, and $m_v$ represents the number of pixels per unit distance in a vertical direction of coordinates of the image. Since the hemispherical target is captured in the target image, and the boundary of the hemispherical target defines a circle in space, an ellipse is obtained when the circle is imaged in the image coordinate system. Thus, an ellipse is fitted from the obtained boundary points of the circle in the image. By extracting the boundary of the ellipse, the length a of the major axis of the ellipse and the length b of the minor axis of the ellipse can be obtained. Specifically, the ellipse fitting equation is $$\left(\frac{u-u_0}{a}\right)^2+\left(\frac{v-v_0}{b}\right)^2=1,$$

where a is the length of the major axis of the ellipse and b is the length of the minor axis of the ellipse, in which the values of a and b can be obtained through measurement, and thus the values of the principal point $(u_0, v_0)$ can be calculated therefrom. According to the values of a and b as well as equations $m_u=a/r_{max}$ and $m_v=b/r_{max}$, the initial values of $m_u$ and $m_v$ are obtained.

According to the fitted ellipse, the length a of the major axis of the ellipse and the length b of the minor axis of the ellipse can be obtained. Since the radius is calculated by the equation $r_{max}=k_1\theta_{max}+k_2\theta_{max}^3+k_3\theta_{max}^5+k_4\theta_{max}^7+k_5\theta_{max}^9$, $k_1=f$, $k_2=0$, $k_3$, $k_4$, and $k_5$ are all set as 0, $r_{max}=f\theta_{max}$ is resulted. On the basis of this, the values of $m_u$ and $m_v$ are obtained according to the values of a and b and the equations $m_u=a/r_{max}$ and $m_v=b/r_{max}$.

In some embodiments, for a full-frame camera, the principal point may be initially set at the center of the image, and the initial values of $m_u$ and $m_v$ are obtained by using the pixel size given by the fisheye camera manufacturer, where $m_u$ represents the number of pixels per unit distance in the horizontal direction of coordinates of the image, and $m_v$ represents the number of pixels per unit distance in the vertical direction of coordinates of the image.

At block S250, a Levenberg-Marquardt algorithm is used to optimize the initial values of $k_1$, $k_2$, $k_3$, $k_4$, $k_5$, $u_0$, $v_0$, $m_u$ and $m_v$, thereby determining the imaging model parameters of the fisheye camera.

After the initial values of $k_1$, $k_2$, $k_3$, $k_4$, $k_5$, $u_0$, $v_0$, $m_u$ and $m_v$ are acquired, the Levenberg-Marquardt algorithm may be used to optimize the initial values of $k_1$, $k_2$, $u_0$, $v_0$, $m_u$ and $m_v$ and optimize the initial values of the high-order distortion parameters $k_3$, $k_4$ and $k_5$ which are initially set as 0, to determine the imaging model parameters of the fisheye camera.

Specifically, the sum of squares of the differences between the projection values and respective measurement values of the markers provided on the hemispherical target is minimized, that is, the difference between the projection value and respective measurement value of each marker provided on the hemispherical target is calculated and the sum of squares of the differences of all the markers is minimized. The projection value of one marker refers to the pixel coordinates corresponding to the marker that are calculated according to the projection model, after the world coordinates corresponding to the marker are obtained from the hemispherical coordinate system established basing on the hemispherical target; and the measurement value of the marker refers to the pixel coordinates corresponding to the marker that are measured from the target image, after the hemispherical target is captured by the fisheye camera.

Minimizing the sum of squares of the differences between the projection values and respective measurement values of the markers provided on the hemispherical target means that the value of an objective function $\Sigma_{j=1}^{N} d(\overline{m}_j, m_j)^2$ is minimized, where N represents the number of the markers provided on the hemispherical target, $\overline{m}_j$ is the projection value of a j-th marker, i.e., the pixel coordinates of the j-th marker that are calculated according to the projection model, and $m_j$ is the measurement value of the j-th marker, i.e., the pixel coordinates of the j-th marker that are measured from the image.

In the fisheye camera calibration method provided by the embodiments of the disclosure, the target image of the hemispherical target is captured, where the hemispherical target and multiple markers disposed on the hemispherical inner surface of the hemispherical target are captured in the target image. Based on the target image, the selected radial distortion model is fitted with the equidistant projection model, to obtain initial values of distortion parameters $k_1$, $k_2$, $k_3$, $k_4$ and $k_5$. According to the initial values of the distortion parameters $k_1$, $k_2$, $k_3$, $k_4$ and $k_5$ and the equation $r_{max} = k_1 \theta_{max} + k_2 \theta_{max}^3 + k_3 \theta_{max}^5 + k_4 \theta_{max}^7 + k_5 \theta_{max}^9$, the radius $r_{max}$ is calculated, where $\theta_{max}$ represents the maximum field of view. Initial values of $u_0$, $v_0$, $m_u$ and $m_v$ are acquired, where $(u_0, v_0)$ represents the principal point, $m_u$ represents the number of pixels per unit distance in the horizontal direction of coordinates of the image, and $m_v$ represents the number of pixels per unit distance in the vertical direction of coordinates of the image. The initial values of the high-order distortion parameters $k_3$, $k_4$ and $k_5$ are set as 0, and the Levenberg-Marquardt algorithm is used to optimize the initial values of the parameters ($k_1$, $k_2$, $k_3$, $k_4$, $k_5$, $u_0$, $v_0$, $m_u$ and $m_v$), to determine imaging model parameters of the fisheye camera. By capturing the target image of the hemispherical target, there is no need to move the target or the camera to capture multiple target images, and only one target image is sufficient to realize fast and high-precision calibration of the fisheye camera.

Figure 7:
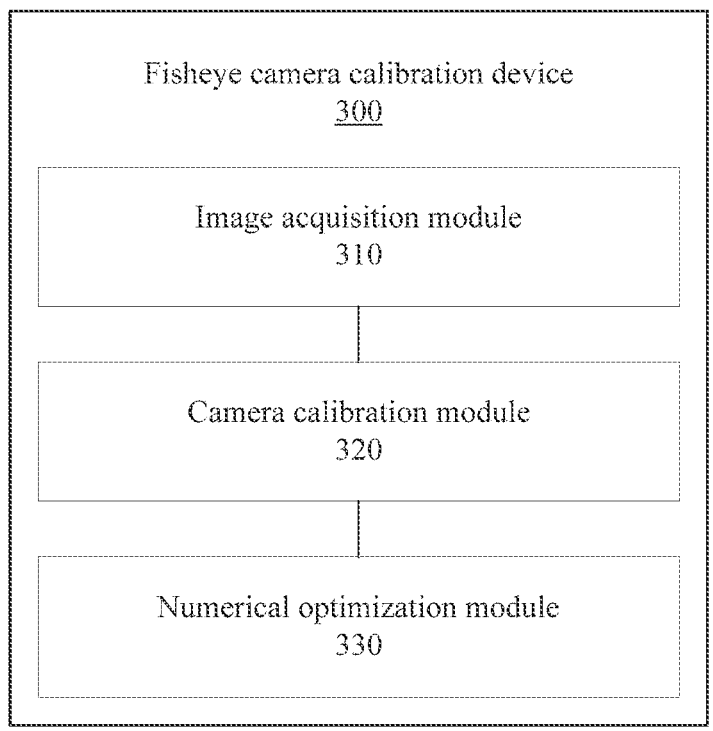
FIG. 7 is a structural block diagram illustrating a fisheye camera calibration device provided by the embodiments of the present disclosure.

Referring to FIG. 7, a fisheye camera calibration device 300 provided by the embodiments of the present disclosure is illustrated. The device 300 includes an image acquisition module 310, a camera calibration module 320, and a numerical optimization module 330.

The image acquisition module 310 is configured to acquire a target image, where a hemispherical target and multiple markers disposed on a hemispherical inner surface of the hemispherical target are captured in the target image. The camera calibration module 320 is configured to: fit, according to the target image, a selected radial distortion model with an equidistant projection model, to obtain initial values of distortion parameters $k_1$, $k_2$, $k_3$, $k_4$ and $k_5$. The camera calibration module is further configured to calculate a radius $r_{max}$ according to the initial values of the distortion parameters $k_1$, $k_2$, $k_3$, $k_4$ and $k_5$ and an equation $r_{max} = k_1 \theta_{max} + k_2 \theta_{max}^3 + k_3 \theta_{max}^5 + k_4 \theta_{max}^7 + k_5 \theta_{max}^9$, where $\theta_{max}$ represents a maximum field of view. The camera calibration module is further configured to acquire initial values of $u_0$, $v_0$, $m_u$ and $m_v$, where $(u_0, v_0)$ represents the principal point, $m_u$ represents the number of pixels per unit distance in a horizontal direction of coordinates of the image, and $m_v$ represents the number of pixels per unit distance in a vertical direction of coordinates of the image. The numerical optimization module 330 is configured to optimize the initial values of $k_1$, $k_2$, $k_3$, $k_4$, $k_5$, $u_0$, $v_0$, $m_u$ and $m_v$ by using a Levenberg-Marquardt algorithm, thereby determining imaging model parameters of the fisheye camera.

Further, the camera calibration module 320 is further configured to select the radial distortion model $r_{max} = k_1 \theta + k_2 \theta^3 + k_3 \theta^5 + k_4 \theta^7 + k_5 \theta^9$ and the equidistant projection model $r = f\theta$, where r represents a distance from a point in the target image to the distortion center, f represents the focal length of the fisheye camera, and $\theta$ represents an angle between an incident light and an optical axis of the fisheye camera. The camera calibration module 320 is further configured to fit the distortion model with the equidistant projection model to obtain $k_1 = f$ and $k_2 = 0$.

Further, the camera calibration module 320 is further configured to calculate the radius $r_{max}$ as $f^* \theta_{max}$, i.e., $r_{max} = f^* \theta_{max}$, according to $k_1 = f$, $k_2 = 0$, as well as $k_3$, $k_4$, and $k_5$ which are all initially set as 0, and based on the equation $r_{max} = k_1 \theta_{max} + k_2 \theta_{max}^3 + k_3 \theta_{max}^5 + k_4 \theta_{max}^7 + k_5 \theta_{max}^9$.

Further, the camera calibration module 320 is further configured to perform ellipse fitting on the hemispherical target in the target image; acquire boundary points of the hemispherical target in the target image; performing ellipse fitting based on the boundary points and an ellipse fitting equation $$\left(\frac{u-u_0}{a}\right)^2 + \left(\frac{v-v_0}{b}\right)^2 = 1,$$

to obtain values of a, b, $u_0$ and $v_0$, where a is a length of a major axis of an ellipse, b is a length of a minor axis of the ellipse, and $(u_0, v_0)$ represents the principle point. The camera calibration module is further configured to obtain initial values of $m_u$ and $m_v$, according to the values of a and b and equations $m_u = a/r_{max}$ and $m_v = b/r_{max}$.

Further, the numerical optimization module 330 is further configured to use the Levenberg-Marquardt algorithm to minimize the sum of squares of differences between projection values and respective measurement values of the markers disposed on the hemispherical target.

It should be noted that those skilled in the art can clearly understand that the specific working processes of the device and modules described above can be referred to the corresponding processes in the foregoing method embodiments, which will not be repeated here for the convenience and conciseness of description.

In summary, in the fisheye camera calibration method and device provided in the embodiments of the present disclosure, the target image of the hemispherical target is captured, where the hemispherical target and multiple markers disposed on the hemispherical inner surface of the hemispherical target are captured in the target image. Based on the target image, the selected radial distortion model is fitted with the equidistant projection model, to obtain initial values of distortion parameters $k_1$, $k_2$, $k_3$, $k_4$ and $k_5$. According to the initial values of the distortion parameters $k_1$, $k_2$, $k_3$, $k_4$, and $k_5$ and the equation $r_{max}=k_1\theta_{max}+k_2\theta_{max}^3+k_3\theta_{max}^5+k_4\theta_{max}^7+k_5\theta_{max}^9$, the radius $r_{max}$ is calculated, where $\theta_{max}$ represents the maximum field of view. Initial values of $u_0$, $v_0$, $m_u$ and $m_v$ are acquired. The initial values of the high-order distortion parameters $k_3$, $k_4$ and $k_5$ are set as 0, and the Levenberg-Marquardt algorithm is used to optimize the initial values of the parameters ($k_1$, $k_2$, $k_3$, $k_4$, $k_5$, $u_0$, $v_0$, $m_u$ and $m_v$), to determine imaging model parameters of the fisheye camera. By adopting the hemispherical target, there is no need to move the target or the camera to capture multiple target images, and only one target image is sufficient to realize fast and high-precision calibration of the fisheye camera.

In the embodiments provided in this disclosure, the coupling, including direct coupling or communication connection, between the modules shown or discussed may be indirect coupling or communication connection by means of some interfaces, devices or modules, which may be electrical, mechanical or in other form.

In addition, the functional modules in the embodiments of the disclosure may be integrated into one processing module, or each of the modules may exist alone physically, or two or more modules may be integrated into one module. The integrated module may be implemented in hardware or software functional module(s).

Figure 8:
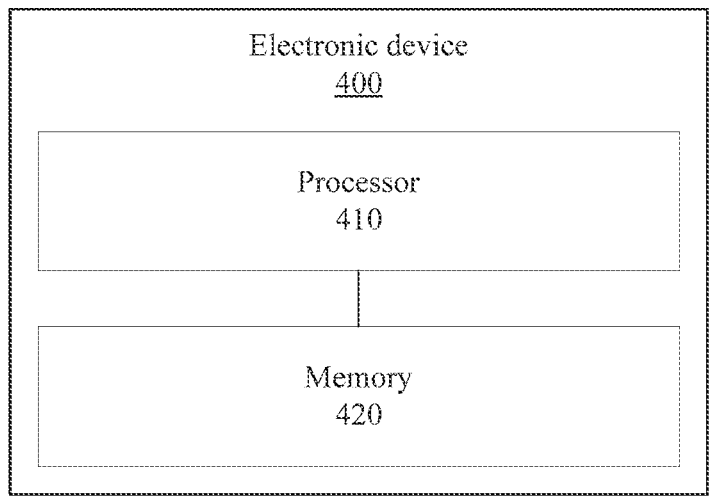
FIG. 8 is a structural block diagram illustrating an electronic device provided by the embodiments of the present disclosure, which is configured to execute the fisheye camera calibration method provided by the embodiments of the present disclosure.

Referring to FIG. 8, a structural block diagram of an electronic device provided by the embodiment of the present disclosure is illustrated. The electronic device 400 may be a mobile terminal capable of data processing, such as a mobile phone or a tablet computer.

The electronic device 400 provided by the embodiment of the present disclosure may include one or more of the following components: a processor 410, a memory 420, and one or more application programs, where the one or more application programs may be stored in the memory 420 and configured to be executed by one or more processors 410, and the one or more programs are configured to execute the method described in the foregoing method embodiments.

The processor 410 may include one or more processing cores. The processor 410 uses various interfaces and lines to connect various parts of the entire electronic device 400, and performs various functions and data processing of the electronic device 400 by running or executing instructions, programs, code sets, or instruction sets stored in the memory 420, and calling data stored in the memory 420. Optionally, the processor 410 may be implemented in least one selected from a Digital Signal Processor (DSP), a Field-Programmable Gate Array (FPGA), and a Programmable Logic Array (PLA). The processor 410 may be integrated with one or a more of a Central Processing Unit (CPU), a Graphics Processing Unit (GPU), a modem and the like. The CPU mainly copes with the operating system, user interface, and application programs. The GPU is responsible for rendering and drawing of display contents. The modem is used for processing wireless communication. It is understandable that the modem may not be integrated into the processor 410, and may be implemented by a separate communication chip.

The memory 420 may include a Random Access Memory (RAM), and may also include a Read-Only Memory (ROM). The memory 420 may be used to store instructions, programs, codes, code sets or instruction sets. The memory 420 may include a program storage area and a data storage area. The program storage area may store instructions for implementing the operating system, instructions for implementing at least one function (such as touch function, sound playback function, image playback function, etc.), and instructions for implementing the various method embodiments, and the like. The data storage area can also store data created by the electronic device 400 during use (such as phone book, audio and video data, chat record data), and the like.

Figure 9:
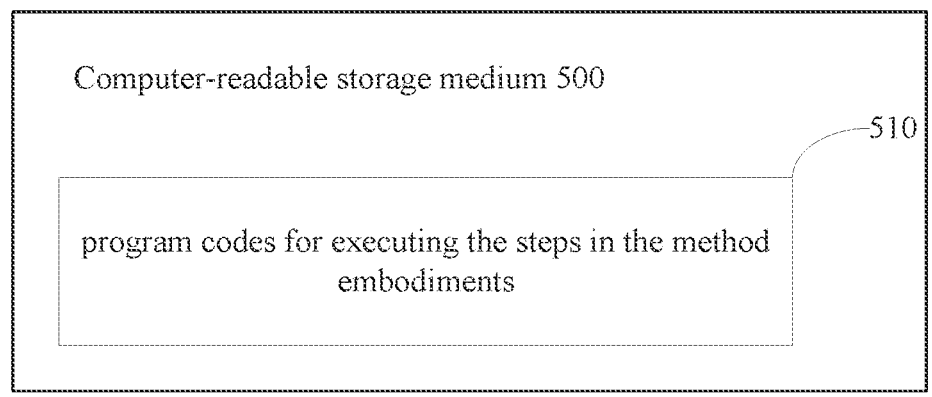
FIG. 9 shows schematically a storage medium provided by the embodiments of the present disclosure, which is configured to store or carry program codes for implementing the fisheye camera calibration method provided by the embodiments of the present disclosure.

Referring to FIG. 9, a structural block diagram of a computer-readable storage medium provided by the embodiments of the present disclosure is shown. The computer-readable storage medium 500 stores program codes 510 therein, and the program codes can be invoked by the processor to execute the method described in the foregoing method embodiments.

The computer-readable storage medium 500 may be an electronic memory, such as a flash memory, an Electrically Erasable Programmable Read Only Memory (EEPROM), an EPROM, a hard disk, or a ROM. Optionally, the computer-readable storage medium 500 includes a non-transitory computer-readable storage medium. The computer-readable storage medium 500 has a storage space for the program codes 510 for executing any method steps in the above-mentioned methods. These program codes can be read from or written into one or more computer program products. The program codes 510 may be for example compressed in a suitable form.

Finally, it should be noted that the above embodiments are only used to illustrate the technical solutions of the disclosure, rather than limiting them. Although the disclosure has been described in detail with reference to the foregoing embodiments, those of ordinary skill in the art should understand that, the technical solutions recited in the foregoing embodiments can also be modified, or some of the technical features thereof can also be equivalently replaced, and such modifications or replacements do not cause the essence of the corresponding technical solutions to depart from the spirit and scope of the technical solutions of the embodiments of the present disclosure.

What is claimed is:

1. A fisheye camera calibration system, comprising:
   a hemispherical target, comprising a hemispherical inner surface and a plurality of markers disposed on the hemispherical inner surface; wherein a plurality of holes are provided in the hemispherical inner surface, and a light-transmitting diffuse reflection film is placed on and covers the plurality of holes;
   a fisheye camera, configured to photograph the hemispherical target to capture a target image, wherein the hemispherical target and the plurality of markers disposed on the hemispherical inner surface are captured in the target image; and
   an electronic device, configured to:
      fit, according to the target image, a selected radial distortion model with a selected equidistant projection model, to obtain initial values of distortion parameters $k_1$, $k_2$, $k_3$, $k_4$ and $k_5$;

calculate a radius $r_{max}$ according to the initial values of the distortion parameters $k_1$, $k_2$, $k_3$, $k_4$ and $k_5$ and an equation $r_{max}=k_1\theta_{max}+k_2\theta_{max}^3+k_3\theta_{max}^5+k_4\theta_{max}^7+k_5\theta_{max}^9$, where $\theta_{max}$ represents a maximum field of view;

acquire initial values of $u_o$, $v_o$, $m_u$ and $m_v$, where ($u_o$, $v_o$) represents a principal point of the fisheye camera, $m_u$ represents the number of pixels per unit distance in a horizontal direction of coordinates of the target image, and $m_v$ represents the number of pixels per unit distance in a vertical direction of coordinates of the target image; and optimize the initial values of $k_1$, $k_2$, $k_3$, $k_4$ and $k_5$, $u_o$, $v_o$, $m_u$ and $m_v$ by using a Levenberg-Marquardt algorithm, thereby determining imaging model parameters of the fisheye camera.

2. The system as claimed in claim 1, wherein the hemispherical target comprises a housing, and the hemispherical inner surface is defined inside the housing and is concave in the housing.

3. The system as claimed in claim 2, wherein a distance from a center of each hole to a center of sphere of the hemispherical inner surface is equal to a radius of the hemispherical inner surface, the hemispherical target further comprises at least one light source, the at least one light source is disposed inside the housing and located at an opposite side from the hemispherical inner surface, and the plurality of markers on the hemispherical inner surface are formed when light emitted from the at least one light source passes through the plurality of holes.

4. The system as claimed in claim 3, wherein the hemispherical inner surface of the hemispherical target is black.

5. The system as claimed in claim 1, wherein the number of the plurality of markers is not less than 23, one of the markers is disposed at a center of the hemispherical inner surface, and other markers are evenly distributed on the hemispherical inner surface.

6. The system as claimed in claim 1, wherein the fisheye camera is disposed at a center of sphere of the hemispherical inner surface of the hemispherical target.

7. The system as claimed in claim 1, wherein the plurality of markers are disposed at different longitudes and latitudes in a spherical coordinate system established basing on the hemispherical target.

8. The system as claimed in claim 1, wherein the electronic device is further configured to:

select the radial distortion model $r=k_1\theta+k_2\theta^3+k_3\theta^5+k_4\theta^7+k_5\theta^9$ and the equidistant projection model $r=f\theta$, where r represents a distance from a point in the target image to a distortion center, f represents a focal length of the fisheye camera, and $\theta$ represents an angle between an incident light and an optical axis of the fisheye camera;

set initial value of the distortion parameters $k_3$, $k_4$ and $k_5$ as 0; and fit the radial distortion model with the equidistant projection model, thereby obtaining $k_1=f$ and $k_2=0$.

9. The system as claimed in claim 8, wherein the electronic device is further configured to:

calculate the radius $r_{max}$ as $f*\theta_{max}$, i.e., $r_{max}=f*\theta_{max}$, based on $k_1=f$, $k_2=0$, the initial values of $k_3$, $k_4$ and $k_5$, and the equation $r_{max}=k_1\theta_{max}+k_2\theta_{max}^3+k_3\theta_{max}^5+k_4\theta_{max}^7+k_5\theta_{max}^9$.

10. The system as claimed in claim 9, wherein the electronic device is further configured to:

perform ellipse fitting on the hemispherical target in the target image;

acquire boundary points of the hemispherical target in the target image;

perform ellipse fitting based on the boundary points and an ellipse fitting equation $$\left(\frac{u-u_0}{a}\right)^2 + \left(\frac{v-v_0}{b}\right)^2 = 1,$$

thereby obtaining values of a, b, $u_o$ and $v_o$, where a is a length of a major axis of an ellipse, and b is a length of a minor axis of the ellipse; and obtain initial values of $m_u$ and $m_v$, according to the values of a and b and equations $m_u=a/r_{max}$ and $m_v=b/r_{max}$.

11. The system as claimed in claim 10, wherein the electronic device is further configured to:

minimize, by using the Levenberg-Marquardt algorithm, a sum of squares of differences between projection values and respective measurement values of the markers disposed on the hemispherical target, the projection value of each marker indicates pixel coordinates corresponding to the marker that are calculated according to the equidistant projection model, and the measurement value of the marker indicates pixel coordinates corresponding to the marker that are measured from the target image.

12. A fisheye camera calibration method, applicable to a calibration system comprising a hemispherical target and a fisheye camera to be calibrated, the hemispherical target comprising a hemispherical inner surface and a plurality of markers disposed on the hemispherical inner surface, wherein a plurality of holes are provided in the hemispherical inner surface, a light-transmitting diffuse reflection film is placed on and covers the plurality of holes, and the method comprises:

acquiring a target image captured by the fisheye camera, wherein the hemispherical target and the plurality of markers disposed on the hemispherical inner surface are captured in the target image;

fitting, according to the target image, a selected radial distortion model with a selected equidistant projection model, to obtain initial values of distortion parameters $k_1$, $k_2$, $k_3$, $k_4$ and $k_5$;

calculating a radius $r_{max}$ according to the initial values of the distortion parameters $k_1$, $k_2$, $k_3$, $k_4$ and $k_5$ and an equation $r_{max}=k_1\theta_{max}+k_2\theta_{max}^3+k_3\theta_{max}^5+k_4\theta_{max}^7+k_5\theta_{max}^9$, where $\theta_{max}$ represents a maximum field of view;

acquiring initial values of $u_o$, $v_o$, $m_u$ and $m_v$, where ($u_o$, $v_o$) represents a principal point of the fisheye camera, $m_u$ represents the number of pixels per unit distance in a horizontal direction of coordinates of the target image, and $m_v$ represents the number of pixels per unit distance in a vertical direction of coordinates of the target image; and optimizing the initial values of $k_1$, $k_2$, $k_3$, $k_4$ and $k_5$, $u_o$, $v_o$, $m_u$ and $m_v$ by using a Levenberg-Marquardt algorithm, thereby determining imaging model parameters of the fisheye camera.

13. The method as claimed in claim 12, wherein the fitting, according to the target image, a selected radial distortion model with a selected equidistant projection model, to obtain initial values of distortion parameters $k_1$, $k_2$, $k_3$, $k_4$ and $k_5$, comprises:

select the radial distortion model $r=k_1\theta+k_2\theta^3+k_3\theta^5+k_4\theta^7+k_5\theta^9$ and the equidistant projection model $r=f\theta$, where r represents a distance from a point in the target image to a distortion center, f represents a focal length of the fisheye camera, and $\theta$ represents an angle between an incident light and an optical axis of the fisheye camera;

setting initial values of distortion parameters $k_3$, $k_4$ and $k_5$ as 0; and fitting the radial distortion model with the equidistant projection model, thereby obtaining $k_1=f$ and $k_2=0$.

14. The method as claimed in claim 13, wherein the calculate a radius $r_{max}$ according to the initial values of the distortion parameters $k_1$, $k_2$, $k_3$, $k_4$ and $k_5$ and an equation $r_{max}=k_1\theta_{max}+k_2\theta_{max}^3+k_3\theta_{max}^5+k_4\theta_{max}^7+k_5\theta_{max}^9$ comprises:

calculate the radius $r_{max}$ as $f*\theta_{max}$, i.e., $r_{max}=f*\theta_{max}$, according to $k_1=f$, $k_2=0$, the initial values of $k_3$, $k_4$ and $k_5$, that are set to 0, and the equation $r_{max}=k_1\theta_{max}+k_2\theta_{max}^3+k_3\theta_{max}^5+k_4\theta_{max}^7+k_5\theta_{max}^9$.

15. The method as claimed in claim 14, wherein the acquiring initial values of $u_o$, $v_o$, $m_u$ and $m_v$, comprises:

performing ellipse fitting on the hemispherical target in the target image;

acquiring boundary points of the hemispherical target in the target image;

performing ellipse fitting based on the boundary points and an ellipse fitting equation $$\left(\frac{u-u_0}{a}\right)^2 + \left(\frac{v-v_0}{b}\right)^2 = 1,$$

thereby obtaining values of a, b, $u_o$ and $v_o$, where a is a length of a major axis of an ellipse, and b is a length of a minor axis of the ellipse; and obtaining initial values of $m_u$ and $m_v$, according to the values of a and b and equations $m_u=a/r_{max}$ and $m_v=b/r_{max}$.

16. The method as claimed in claim 12, wherein the acquiring initial values of $u_o$, $v_o$, $m_u$ and $m_v$, comprises:

setting $(u_o, v_o)$ at a center of the target image; and acquiring initial values of $m_u$ and $m_v$, according to parameters of a lens of the fisheye camera.

17. The method as claimed in claim 12, wherein the optimizing the initial values of $k_1$, $k_2$, $k_3$, $k_4$ and $k_5$, $u_o$, $v_o$, $m_u$ and $m_v$ by using a Levenberg-Marquardt algorithm, comprises:

minimizing, by using the Levenberg-Marquardt algorithm, a sum of squares of differences between projection values and respective measurement values of the markers disposed on the hemispherical target, the projection value of each marker indicates pixel coordinates corresponding to the marker that are calculated according to the equidistant projection model, and the measurement value of the marker indicates pixel coordinates corresponding to the marker that are measured from the target image.

* * * * *